L. W. THOMPSON.
AUTOMATIC REGULATING SYSTEM.
APPLICATION FILED AUG. 3, 1920.
1,419,778.
Patented June 13, 1922.
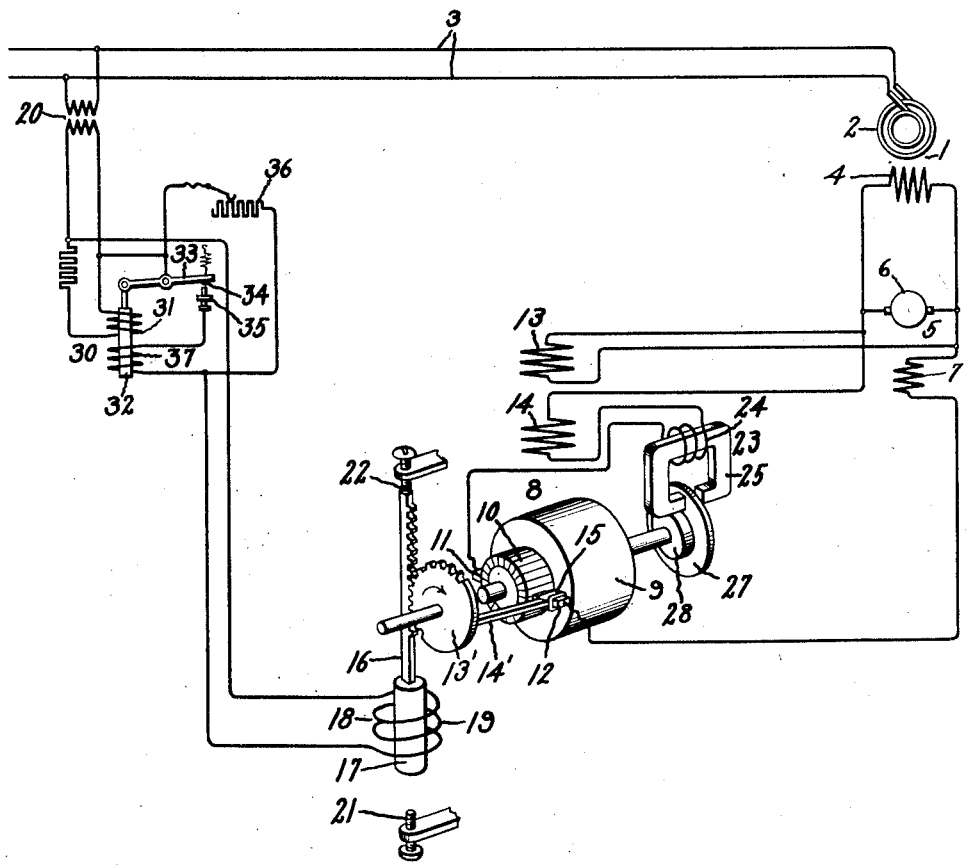
Inventor:
Louis W. Thompson,
by *Albert G. Davis*
His Attorney

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

AUTOMATIC REGULATING SYSTEM.

1,419,778. Specification of Letters Patent. Patented June 13, 1922.

Application filed August 3, 1920. Serial No. 400,934.

*To all whom it may concern:*

Be it known that I, LOUIS W. THOMPSON, a citizen of the United States, residing at Schenectady, in the county of Schenectady, State of New York, have invented certain new and useful Improvements in Automatic Regulating Systems, of which the following is a specification.

My invention relates to automatic regulating systems in which a dynamo electric machine is arranged to control, by its counter-electromotive force, the current in the circuit to be regulated or the current in a circuit, the control of which determines the electrical condition of the circuit to be regulated, as, for example, the current in the field circuit of a dynamo electric machine or its exciter, which current determines the voltage of the dynamo electric machine.

An object of my invention is to provide a regulating arrangement of the character referred to which is accurate and reliable in operation and quickly responsive to changes in the electrical condition to be regulated.

A further object of my invention is to provide a regulating arrangement of the character referred to in which no circuit carrying large currents have to be opened and closed by means of a vibrating contact.

A still further object of my invention is to provide a regulating arrangement of the character referred to, whereby a much smaller regulating machine may be used than has been used in arrangements of this character heretofore proposed.

In accordance with my invention, I provide an arrangement whereby the regulating effect of the regulating dynamo electric machine is varied by changing the relative positions of the brushes of a set of brushes of the regulating machine in response to variations in the electrical condition being regulated.

My invention will be better understood from the following description taken in connection with the accompanying drawing and its scope will be pointed out in the appended claims.

Referring to the drawing, which discloses one embodiment of my invention, 1 represents an alternating current generator comprising an armature 2 which is adapted to supply current to the mains 3 and a field winding 4 which is connected to an exciter 5 of any suitable type. As shown in the drawing, the exciter comprises an armature 6 and a shunt field winding 7.

8 represents a motor having an armature 9, a commutator 10, a stationary brush 11 and a movable brush 12 connected in series with the exciter field winding 7, a main field winding 13 connected across the brushes of the exciter 5 and a differential field winding 14. While the movable brush 12 may be moved in any suitable manner around the commutator 10, I prefer to use the arrangement shown in the drawing which comprises a pinion 13' which has attached thereto an arm 14' carrying the brush holder 15. The pinion 13' is adapted to be rotated by means of a rack 16 connected to the core 17 of a relay 18. The position of the core 17 depends upon the energization of a coil 19 which is adapted to be connected across the mains 3 by means of a potential transformer 20. 21 and 22 represent adjustable stops for limiting the movement of the core 17.

The stop 21 is adjusted so that when the core 17 is in engagement therewith, the brush 12 is brought as near to the stationary brush 11 as is possible without stopping the motor 8. With the brushes so situated, the counter-electromotive force developed in the circuit of the field winding 7 is very small and, therefore, when the generator 1 is being started, at which time the core 17 is in engagement with the stop 21, the voltage of the generator will build up very rapidly. It will also be evident that the brushes will be so situated when the load on the generator is very heavy at which time the exciter voltage has to be a maximum.

If it were so desired, the movable brush 12 could be moved nearer to the stationary brush 11 so as to stop the motor when the core 17 is in engagement with the adjustable stop 21. I find, however, that if the motor is brought to a standstill in this manner, the regulating action of the regulator is materially delayed when the movable brush 12 is moved away from the stationary brush 11 and therefore prefer not to stop the motor. This delay is due to the appreciable time it takes for the speed of the motor to build up from standstill.

The position of the adjustable stop 22 is such that when the rack 16 is in engagement therewith, the movable brush 12 is diametrically opposite to the stationary brush 11. When the movable brush 12 occupies this position the counter-electromotive force developed in the circuit of the field winding 7 is a maximum.

In order to prevent the motor from running away, I provide a brake 23 of the magnetic drag type comprising an energizing winding 24 connected in series with the exciter field winding 7 and a core 25 between the poles of which is located an armature 27 which is connected to rotate with the armature 9 of the motor. Since the energizing winding 24 of the brake 23 is connected so that the current flowing through it varies with the load connected to the generator 1, the brake tends to slow the motor down with an increase in load and consequently a larger current through the motor armature is required in order to develop the necessary counter-electromotive force than would be the case if the current through the energizing winding 24 of the brake remained constant. Therefore, a smaller movement of the movable brush 12 is required to produce the necessary changes in the counter-electromotive force as load changes than would be the case if the current through the energizing winding 24 remained constant.

Although the magnetic drag brake which is illustrated has been found to give very satisfactory results, it is not essential, for the satisfactory operation of my invention, that this particular type of brake be employed, but numerous other types of brakes which are adapted to oppose the rotation of the motor with a counter-torque which does not decrease with an increase in the motor speed may be used with success.

28 represents a fly-wheel connected to rotate with the armature 9 of the motor 8 and the armature 27 of the brake 23. The function of this fly-wheel is to prevent sudden changes while permitting gradual changes in the speed of the motor. Obviously, however, the same results can be obtained by designing some part of the rotating element of the motor such as the armature 9 or the armature 27 or both to have the necessary fly-wheel effect in which event the fly-wheel 28 can be dispensed with.

In order to vary the energization of the coil 19 in response to variations in the voltage of the generator 1, I provide a vibratory device 30 having a winding 31 connected across the mains 3 by means of the potential transformer 20, a movable core 32, a movable arm 33 connected to be actuated by the movable core 32, a movable contact 34 carried by the movable arm 33 and a stationary contact 35 cooperating with the movable contact 34. One terminal of a resistance 36 is connected to the movable contact 34 and the other terminal of the resistance is connected to the stationary contact 35. The function of this resistance is to prevent sparking when the movable contact 34 is moved out of engagement with the stationary contact 35. 37 represents an anti-hunting coil wound on the core 32 and adapted to be energized each time the movable contact 34 is moved into engagement with the stationary contact 35. This anti-hunting coil is wound differentially with respect to the coil 31 so that it will tend to cause the movable contact 34 to be moved out of engagement with the stationary contact 35 thereby preventing hunting, which would otherwise result due to the time lag of the system.

The operation of the system shown is as follows: Let it be assumed that the generator 1 and the exciter 5 are in operation and that the field winding 4 of the generator is energized to an extent just sufficient to cause it to maintain the desired predetermined voltage across the mains 3. Under these conditions the motor 8 is running, since its field winding 13 and armature 9 are both energized and its rotation is opposed by the brake 23 and the vibratory device 30 is in operation. The period during which the movable contact 34 is in engagement with the stationary contact 35 bears such a relation to the period during which the movable contact 34 is out of engagement with the stationary contact 35, that the energization of the coil 19 is maintained at such a value that the movable brush 12 is maintained in a position in which the counter-electromotive force developed in the circuit of the field winding 7 of the exciter is just sufficient to maintain the voltage of the generator at the predetermined value. It will be noted that when the movable contact 34 engages the stationary contact 35, the resistance 36 in series with the coil 19 of the relay 18, is short circuited and at the same time the anti-hunting winding 37 is energized so that the anti-hunting coil causes a rapid vibration of the arm 33 independent of the variations in the voltage of the mains 3 thereby preventing hunting. If the voltage across the mains 3 increases above the desired predetermined value, the contacts 34 and 35 will be in engagement with each other a greater portion of the time thereby increasing the energization of the coil 19 of the relay 18. The core 17 is thereby moved farther up into the coil 19. This movement of the core 17 rotates the pinion 13' in the direction indicated by the arrow thereon, thereby moving the brush 12 farther away from the stationary brush 11 so that the counter-electromotive force developd in the circuit of the field winding 7 is increased. This increase in the counter-electromotive force decreases the excitation of the exciter 5 and consequently the voltage of the generator 1. Similarly, if the voltage across the mains 3 decreases below the desired predetermined value, the contacts 34 and 35 will be in engagement with each other a smaller portion of the time thereby decreasing the energization of the coil 19 of the relay 18. The core 17 thereupon moves downward due to its own weight. This movement of the core 17 rotates the pinion 13' in the direction opposite to that indicated by the arrow, thereby moving the brush 12 nearer to the stationary brush 11 so that the counter-electromotive force developed in the circuit of the field winding 7 is decreased. This decrease in the counter-electromotive force increases the excitation of the exciter 5 and consequently the voltage of the generator 1. Hence, it will be apparent that the position of the movable brush 12 is changed relatively to the stationary brush 11 upon a slight variation in the voltage across the mains 3 so as to maintain the voltage substantially constant.

Since the differential field winding 14 is connected so that the current therein varies with load on the generator the winding 14 tends to decrease the counter-electromotive force of the motor when the excitation of the generator is increased, thereby aiding the building up of the exciter field current and tends to increase the counter-electromotive force of the motor when the excitation of the generator is decreased thereby aiding the building down of the exciter field current. Therefore, it will be evident that the differential field winding 14 materially improves the speed of the regulator when a sudden change in the electrical condition being regulated occurs.

It will be apparent that since the movable brush 12 is moved towards the stationary brush 11 as the motor armature current increases, a much smaller motor can be used without any danger of the temperature thereof becoming excessive, than could be used if the brushes were held stationary with respect to each other, because in my arrangement each armature conductor carries the heavy field current during only a small portion of each revolution of the armature.

Furthermore it will be apparent that since there are no vibrating contacts in my regulator which open and close circuits carrying large currents, there is very little danger of the regulator not functioning properly due to contacts burning and sticking. If, however, the contacts of the vibratory device used in my arrangement should stick, no injury to apparatus would result because under such conditions the movable brush would be moved so that the regulating motor exerts its maximum regulating effect.

While I have shown and described only one embodiment of my invention, it will be evident that many modifications thereof may be made without departing from the spirit of my invention. Moreover, although I have shown my invention as arranged to regulate the voltage of an alternating current circuit, it is obvious that it is applicable as well to the regulation of the voltage of a direct current circuit and to other electrical conditions obtaining in such circuits. Therefore, I wish it to be understood that I desire to cover in the following claims all such modifications and applications which come within the spirit of my invention.

What I claim as new and desire to secure by Letters Patent of the United States, is:

1. In combination, a circuit to be regulated, a source of supply therefor, a motor arranged to regulate said circuit by its counter-electromotive force, and means adapted to move one brush of said motor relatively to another brush of said motor in accordance with an electrical condition of the circuit to be regulated to vary the regulating effect of said motor.

2. In combination, a circuit to be regulated, a source of supply therefor, a motor arranged to regulate said circuit by its counter-electromotive force, means for moving one brush of said motor relatively to another brush of said motor to vary the regulating effect of said motor, and vibratory means for controlling the operation of said brush moving means in accordance with an electrical condition of the circuit to be regulated.

3. In combination, a circuit to be regulated, a source of supply therefor, a motor arranged to regulate said circuit by its counter-electromotive force, a brake for opposing the rotation of said motor, and means adapted to move one brush of said motor relatively to another brush of said motor in accordance with an electrical condition of the circuit to be regulated to vary the regulating effect of said motor.

4. In combination, a dynamo electric machine, and regulating means therefor comprising a motor provided with a pair of brushes connected so that the counter-electromotive force of the motor controls the excitation of said machine, and means adapted to move one brush of said motor relatively to the other of said brushes in accordance with an electrical condition of the dynamo electric machine.

5. In combination, a dynamo electric machine, and regulating means therefor comprising a motor provided with a pair of brushes connected so that the counter-electromotive force of the motor controls the excitation of said machine, a brake opposing the rotation of said motor, means for preventing sudden changes in the speed of said motor, and means for moving one brush of said motor relatively to the other brush of said motor to vary the regulating effect of said motor.

6. In combination, a circuit to be regulated, a source of supply therefor, a motor arranged to regulate said circuit by its counter-electromotive force, a brake for opposing the rotation of said motor, a relay for varying the position of one of the brushes of said motor relatively to another brush of said motor to vary the regulating effect of said motor, and vibratory means for varying the energization of said relay in accordance with the electrical condition of the circuit to be regulated.

7. In combination, a dynamo electric machine, and regulating means therefor comprising a motor provided with an armature, a set of brushes connected so that the counter-electromotive force of the motor controls the excitation of said machine, a main field winding, and a differential field winding energized in accordance with the current transversing said motor armature and means adapted to move one brush of said set of brushes relatively to the other brush of said set in accordance with an electrical condition of the dynamo electric machine to vary the regulating effect of said motor.

8. In combination, a circuit to be regulated, a source of supply therefor, a motor arranged to regulate said circuit by its counter-electromotive force, and means adapted to move one brush of said motor relatively to another brush of said motor in accordance with an electrical condition of the circuit to be regulated to vary the regulating effect of said motor, and an electromagnetic brake for opposing the rotation of said motor, a winding of said brake being connected so as to be energized in accordance with the current transversing said motor armature.

9. In combination, a circuit to be regulated, a source of supply therefor, a motor arranged to regulate said circuit by its counter-electromotive force, means for moving one brush of said motor relatively to another brush of said motor to vary the regulating effect of said motor, and vibratory means comprising an anti-hunting winding for controlling the operation of said brush moving means in accordance with an electrical condition of the circuit to be regulated.

In witness whereof, I have hereunto set my hand this second day of August 1920.

LOUIS W. THOMPSON.